METHOD OF CALIBRATING ELECTRICAL COMPONENTS

Filed Sept. 12, 1966

INVENTORS.
Barton L. Weller
Robert Swart
BY Eugene J. Caires
David D. Woronoff
ATTORNEY.

Patented July 23, 1968

3,394,386

METHOD OF CALIBRATING ELECTRICAL COMPONENTS

Barton L. Weller, Easton, and Robert Swart and Eugene J. Caires, Newtown, Conn., assignors to Vitramon, Incorporated, Monroe, Conn., a corporation of Delaware
Filed Sept. 12, 1966, Ser. No. 578,755
2 Claims. (Cl. 29—25.42)

The present invention relates to the production of electrical components, and to novel adjusted components formed which have precise electrical properties within a predetermined narrow range.

The components with which the present invention is concerned are structures, such as electrical capacitors, having partially embedded electrical elements which may be formed in a known build-up process and which may contain a number of thin alternating layers of conductive and insulating dielectric materials within the structure, in which the alternate conductive layers or electrodes are connected to leads for connection to an external source of power.

The electrical properties of an electrical component, made according to the known processes, can generally be made within a plus or minus five percent to ten percent range of the nominal or desired value. This range of electrical properties results from a number of factors such as oven temperature variations, dielectric material variations, conducting material variations, variations in conducting material thickness, variations in dielectric material thickness, atmospheric moisture conditions at various stages in the manufacturing process, and numerous other changeable conditions.

There are many instances where the precision of one or more of the electrical properties of an electrical component is critical and where it is necessary that an electrical component in an electrical circuit have very precise electrical properties. In such cases it has been necessary, up to the present, to conduct exhaustive testing of a multiplicity of electrical components until one having the exact properties desired is located, or until the required number of components having the desired electrical properties are located. In such a production system, yields of devices with nearly exact electrical properties from a particular production lot are low. This low yield is expensive in terms of materials, labor, production time, production scheduling and reliability of delivery. In addition, probability considerations show that no particular manufacturing lot assures either a high yield, or even any acceptable components in a range narrow enough to be acceptable as highly precise elements within two percent or less of the nominal value.

In view of these problems, it is an object of the present invention to provide a novel electrical component in which one or more of the electrical properties, for example, the capacitance of a capacitor, will be precisely controlled within a previously established range of values.

Other objects of the present invention are to provide a novel electrical component, which may be a capacitor, inductor, resistor or combinations of them, or the like, in which the uncalibrated electrical, mechanical, thermal and environmental properties are unimpaired and in which the physical appearance of the components is substantially unchanged from the pre-calibrated or imprecise state.

It is another object of the present invention to provide an electrical component having a sealing or filler material which may be a porcelain or ceramic capacitor, which has mechanical strength, insulation resistance, dielectric constant, resistance to thermal shock (among other thermal properties), moisture resistance and other electrical and environmental properties substantially similar to the electrical component which did not require calibration.

It is a further object of the present invention to provide an electrical component having a filler material which has a heat treatment shrinkage which very precisely matches that of the component. A differing degree of heat or firing shrinkage will result in a mechanically unsound part which has low dielectric strength, high dissipation factor and poor physical appearance. Where ceramic or porcelain capacitors or other ceramic or porcelain components are concerned, the firing shrinkage of the sealing or filler material must be essentially zero.

It is a further object of the present invention to provide an electrical component in which a sealing or filler material will attach securely or bond well to the unsealed portion of the electrical component.

It is a further object of the present invention to provide an electrical component in which a sealing or filler material will wet the unsealed portion of the electrical component attaching surfaces to assure a proper bond.

It is a further object of the present invention to provide an electrical component in which a sealing or filler material has a coefficient of thermal expansion substantially similar to that of the unsealed portion of the electrical component in the temperature range of interest, which in the case of some ceramic and porcelain components such as capacitors, resistors, inductors and combinations of them is from about —70° C. to about +200° C. The matched thermal expansion is necessary so that temperature stresses during use of the electrical component will not cause mechanical failure of the component and the resultant electrical failure due to lowered insulation resistance, dielectric strength, current capacity, magnetic properties and altered component value, or any one of these effects.

It is a further object of this invention that imprecise or uncalibrated electrical components need not be discarded merely because one or more electrical properties are different than desired, since these electrical properties may be adjusted to desired values.

It is a still further object of the present invention to achieve the aforementioned mechanical, electrical and thermal integrity of the calibrated or highly precise properties of the electrical component in such a manner that the physical appearance of the electrical component is not adversely effected so that the component is suitable for commercial sale.

Still further objects of the present invention are to provide an electrical component having a sealing or filler material which is practical to work with, easy to handle, and which produces consistent results. Such a material for an electrical component when used with ceramic and porcelain elements must have a sufficiently wide temperature firing range so that the known and unavoidable variations in furnace temperature will not effect the mechanical, thermal, electrical and physical appearance or properties of the component.

Additional objects and advantages of the present invention will be apparent to those skilled in the art in view of the following specification taken in conjunction with the accompanying drawing of an embodiment of the present invention. The specification and drawing are illustrative of the present invention, but are not to be construed as defining the limits of the present invention.

Figure 1:
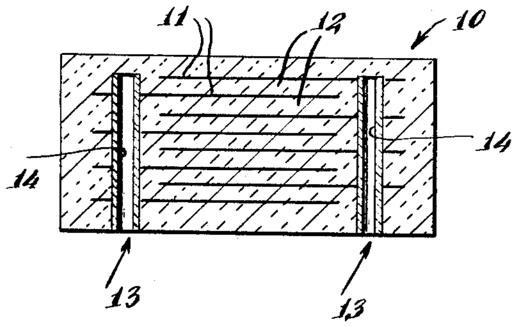
FIGURE 1 is a cross section of an electrical component which is shown as a capacitor.
Figure 4:
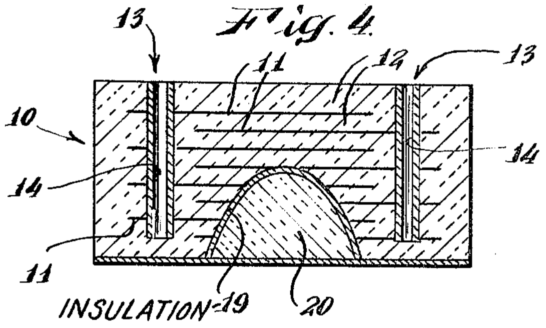
FIGURE 4 is a cross section of the component of FIGURE 3 showing the calibrated component.

As shown in FIGURE 1, one type of electrical component suitable for treatment according to the present invention is a capacitor having a unitized structure which is shown as a body 10 comprising alternate layers of electrically conducting material or electrodes 11 and electrically nonconducting or dielectic material 12. The body is provided with spaced transverse passages 13, which may be lined with conductors to form electrically conductive liners or electrode sleeves 14, which make conductive contact with alternate conducting layers 11. Passages 13 and sleeves 14 are adapted to receive conductive leads to form the final capacitor.

In electrical components of the unitized type shown in FIGURE 1, the electrical properties principally depend upon the area of the electrically conductive materials 11 and on the amount and kind of insulating material separating the conductive materials 11. The electrical properties of such components can be adjusted or controlled by either removing or adding conductive material 11 and nonconductive material 12 until a calibrated electrical property is achieved. The component's surface adjacent the removed or added section is then sealed so that it is protected against the many factors of mechanical, thermal, environmental and electrical degradation.

When the exact degree of adjustment required cannot be readily determined by a visual inspection of the component, the body may be electrically connected to an indicating device of some type so that the change in electrical properties can be determined as the removal or addition is in progress, and the adjustment can be discontinued at precisely the right time.

Figure 2:
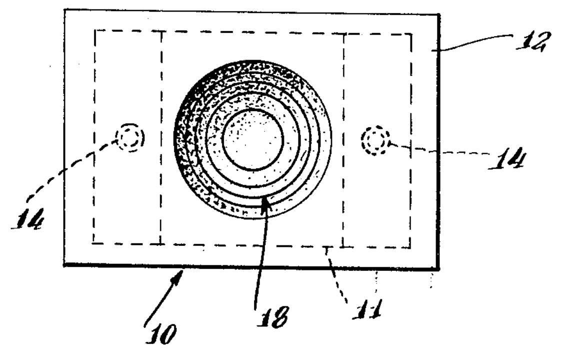
FIGURE 2 is a top view of the component of FIGURE 1 after removal of a portion of the dielectric and conducting surfaces.
Figure 3:
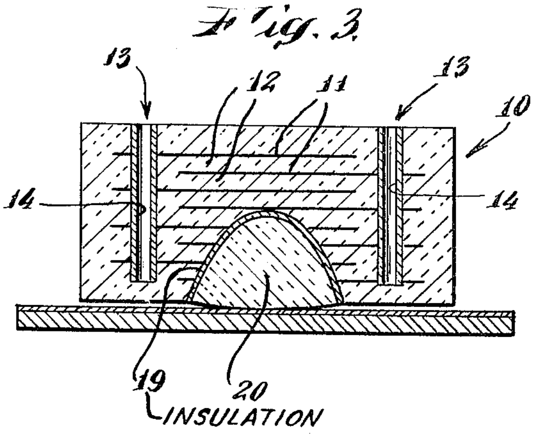
FIGURE 3 is a cross section of the component of FIGURE 2 after various sealing layers have been applied.

It is desirable to enclose the portion of the calibrated electrical component with an electrically nonconductive or insulating layer to prevent loss or degradation of electrical, mechanical, thermal and environmental properties because of air, moisture or other contaminants. This sealing layer, shown as 19 in FIGURE 3, preferably consists in the case of porcelain and ceramic electrical components of a dielectric material properly matched or substantially similar to the material forming layers 12 of the body of the component. The sealing layer 19 may be kept quite thin.

The sealing or covering layer 19 may be applied as a uniformly thin coating over the entire surface area of removed or added section 18. In some cases it is desirable that the covering layer 19 be diffused or seeped in the first portion of the electrical component 10 so that it has a nonuniform physical thickness, but a uniformly good environmental seal. The sealing layer is to insulate and to bond to the exposed electrically conducting layers 11 or electrodes. After the sealing layer is applied, the component may be placed on a drying plate, coated section up, and inserted into a drying oven to evaporate the volatile solvents and solidify the sealing layer 19 as an insulating coating which is free of cracks or voids, and bond the sealing layer to the component. At this point, the component, if it is a porcelain or ceramic component, may be fired in an oven at the required firing temperature after which the electrical, mechanical, thermal and environment characteristics of the calibrated component have been protected so that it is ready for insertion and soldering of the conductive leads into sleeves 14 and then use as a component of known electrical properties.

However, it is preferable to completely repair the removed area 18 by filling it in so that the appearance of the treated component, which may be a capacitor, is substantially the same as it was prior to the erosion step. This not only improves the appearance of the component, but also improves the effectiveness of the sealing layer 19 and further insures against loss or degradation of the mechanical, thermal, environmental and electrical properties of the component. Preferably, in the case of porcelain or ceramic components the filling step is conducted after the sealing layer has been dried and before it has been fired.

The composition 20 used to fill or add to the adjusted section 18 of the component preferably comprises the same composition used in the insulating layers of the component and in the sealing layer. However, this composition preferably consists of a mixture of particles, some of which are different sizes, from both the original composition and within itself in order to insure uniform and complete filling of the removed section 18 overlying the sealing layer 19. The mixture of particles should include particles both larger and smaller than those present in the first or adjusted portion of the component.

After the firing of the composition 20, the component is ready for final processing such as soldering conductive leads to the electrode terminals 14. When this is accomplished in conventional manner, the electrical component of exact known capacitance value is ready for use.

It should be understood that the present invention applies to other types of components having partially embedded electrical conductive and nonconductive elements such as resistors, inductors, thermistors, combinations of these elements and the like. The practice of this invention requires only that the electrical properties of the components be changeable by altering the conductive portion of the component or the insulating portion of the component.

In the case of some porcelain and ceramic components, the same compositions may be used to form both the sealing layer and in the filler composition.

It can be seen that the stated objects and advantages of the invention have been achieved. Numerous changes in the structure shown and described may be made without departing from the scope and spirit of the invention.

We claim:

1. The process of altering the electrical properties of a monolithic body containing at least one erodable electrical layer having at least a major portion thereof embedded in the monolithic body, the electrical properties of which are related to its surface area, which comprises the steps of:

(a) connecting the monolithic body to an instrument designed to indicate the electrical properties of the body;

(b) gradually entering the monolithic body by eroding a portion of a surface of the monolithic body lying in a plane parallel to the electrical layer;

(c) gradually eroding at least a portion of at least one embedded electrical layer to alter the electrical properties of the body to the desired extent, as indicated by the instrument;

(d) applying a first vitreous layer to the eroded areas to form a protective coating;

(e) heating to solidify the coating;

(f) applying a second vitreous layer to the solidified coating to fill the eroded section of the body; and, (g) heating the monolithic body to fuse the coating to the eroded areas and fuse the fill to the coating whereby the eroded surface of the body is built-up to substantially its original plane.

2. The process of claim 1 in which the monolithic body is a capacitor and a plurality of embedded electrical layers are present which comprise alternate layers of conductive electrode material and non-conductive insulating material.

References Cited

UNITED STATES PATENTS

| | | | |
|---|---|---|---|
| 1,650,395 | 11/1927 | Siegel | 317—242 X |
| 2,972,180 | 2/1961 | Gulton | 317—261 X |
| 3,235,939 | 2/1966 | Rodriguez. | |
| 3,305,394 | 2/1967 | Kaiser. | |
| 3,310,719 | 3/1967 | Seney | 317—261 X |

FOREIGN PATENTS

| | | |
|---|---|---|
| 507,143 | 6/1939 | Great Britain. |
| 849,510 | 9/1960 | Great Britain. |

OTHER REFERENCES

Birks, J. B.: Modern Dielectric Material, London Heywood & Co., 1960, pp. 170–171.

LEWIS H. MYERS, *Primary Examiner.*

E. GOLDBERG, *Assistant Examiner.*